US011661100B2

(12) United States Patent
Jeon (10) Patent No.: US 11,661,100 B2
(45) Date of Patent: May 30, 2023

(54) RACK ASSIST ELECTRIC POWER STEERING APPARATUS (71) Applicant: HL MANDO CORPORATION, Gyeonggi-do (KR)

(72) Inventor: In Hwan Jeon, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 519 days.

(21) Appl. No.: 16/551,673

(22) Filed: Aug. 26, 2019

(65) Prior Publication Data
US 2020/0094869 A1    Mar. 26, 2020

(30) Foreign Application Priority Data
Sep. 20, 2018 (KR) .......... 10-2018-0112902

(51) Int. Cl.
*B62D 5/04* (2006.01)
*F16H 25/22* (2006.01)

(52) U.S. Cl.
CPC ......... *B62D 5/0448* (2013.01); *B62D 5/0496* (2013.01); *F16H 25/2219* (2013.01)

(58) Field of Classification Search
CPC .. B62D 5/0448; B62D 5/0403; F16H 25/2219
USPC ........................................................ 180/444
See application file for complete search history.

(56) References Cited

U.S. PATENT DOCUMENTS

| 7,537,080 B2* | 5/2009 | Murakami | B62D 5/0424 180/444 |
| 8,042,645 B2* | 10/2011 | Kurokawa | B62D 5/0424 180/444 |
| 10,780,912 B2* | 9/2020 | Kimura | B62D 3/08 |
| 2006/0219470 A1* | 10/2006 | Imagawa | H02P 29/032 180/446 |
| 2008/0006471 A1* | 1/2008 | Nakamura | B62D 5/0403 180/444 |
| 2013/0161114 A1* | 6/2013 | Bando | F16C 27/066 180/443 |
| 2015/0183455 A1* | 7/2015 | Wang | F16C 25/083 180/444 |
| 2016/0369841 A1* | 12/2016 | Ciulla | F16C 43/06 |
| 2018/0127019 A1* | 5/2018 | Yamaguchi | B62D 3/08 |
| 2019/0161111 A1* | 5/2019 | Kondo | B62D 5/0448 |

(Continued)

FOREIGN PATENT DOCUMENTS

| CN | 107010097 | 8/2017 | |
| DE | 102004007354 A1 * | 9/2005 | ............. H02K 7/06 |
| DE | 102008001959 A1 * | 12/2009 | ........... B62D 5/0424 |

(Continued)

OTHER PUBLICATIONS

JP 5206327 English Translation of Description (Year: 2021).*
(Continued)

*Primary Examiner* — Minnah L Seoh
*Assistant Examiner* — Myles A Harris
(74) *Attorney, Agent, or Firm* — Ladas & Parry, LLP (57) ABSTRACT A rack assist electric power steering apparatus. Shock between a rotary support member and a housing is absorbed. Backlash and friction in the rotary support member are reduced. The length of a ball nut is minimized, and the rotary support member is supported by a portion in which the ball nut and a rack bar are coupled, so that noise is reduced.

14 Claims, 8 Drawing Sheets

(56) References Cited

U.S. PATENT DOCUMENTS

2019/0315390 A1* 10/2019 Shirauchi ............. B62D 5/0481

FOREIGN PATENT DOCUMENTS

| | | | |
|---|---|---|---|
| DE | 102008002627 A1 * | 12/2009 | ......... F16H 25/2214 |
| DE | 102009008591 A1 * | 8/2010 | ........... B62D 5/0448 |
| DE | 102016118476 A1 * | 4/2017 | ............. F16H 25/20 |
| DE | 102019208409 A1 * | 12/2020 | ........... B62D 5/0448 |
| JP | 2010-107018 | 5/2010 | |
| JP | 2010107018 A * | 5/2010 | |
| JP | 2014-237384 | 12/2014 | |
| JP | 2014237384 A * | 12/2014 | |
| KR | 10-2010-0094641 | 8/2010 | |
| KR | 10-2012-0130649 | 12/2012 | |
| KR | 10-1477897 | 12/2014 | |

OTHER PUBLICATIONS

Office Action dated Sep. 19, 2019 for Korean Patent Application No. 10-2018-0112902 and its English machine translation by Google Translate.
Office Action dated Sep. 7, 2021 for Chinese Patent Application No. 201910758436.X and its English translation from Global Dossier.

* cited by examiner

RACK ASSIST ELECTRIC POWER STEERING APPARATUS

CROSS REFERENCE TO RELATED APPLICATION

This application claims priority from Korean Patent Application No. 10-2018-0112902, filed on Sep. 20, 2018, which is hereby incorporated by reference for all purposes as if fully set forth herein.

BACKGROUND

Field

Embodiments relate to a rack assist electric power steering apparatus and, more particularly, to a rack assist electric power steering apparatus having a structure, by which shock between a rotary support member and a housing is absorbed, backlash and friction in the rotary support member are reduced, and the rotary support member is supported by a portion in which a ball nut and a rack bar are coupled, thereby reducing noise.

Description of Related Art

Rack assist electric power steering apparatuses respectively include a driving unit controlled by an electronic control unit (ECU) to generate power. The ECU determines the degree of steering of the steering wheel through a torque sensor mounted on an upper end of a steering column. The rack assist electric power steering apparatus further includes a rack bar moving a tie rod connected to a wheel according to a degree of steering of a steering wheel and a driven unit receiving torque of the driving unit and converts the torque to axial movement force to transmit the axial movement force to another component.

Here, the driving unit includes an electric motor controlled by the ECU, a motor pulley fixed to a shaft of the electric motor, and a belt wound around the motor pulley. The driven unit includes a ball nut surrounding the rack bar and a nut pulley coupled to an outer circumferential surface of the ball nut and wound on the belt.

However, in the conventional rack assist electric power steering apparatus, a ball is elastically deformed so as to be inserted between an inner ring and an outer ring in a bearing supporting a ball nut, and thus, there has been a problem in that backlash inevitably occurs in the bearing, thereby generating noise.

In addition, in the conventional rack assist electric power steering apparatus, the center of a portion, in which a rack bar and a ball nut are coupled, is not aligned with the center of a bearing. Accordingly, the movement of the ball nut may not be effectively prevented to generate noise, and the length of the ball nut should be increased to align the centers.

BRIEF SUMMARY

Various aspects provide a rack assist electric power steering apparatus having a structure, by which shock between a rotary support member and a housing is absorbed, backlash and friction in the rotary support member are reduced, and as the length of a ball nut is minimized, the rotary support member is supported by a portion in which the ball nut and a rack bar are coupled, thereby reducing noise.

The present disclosure is not limited to the aforementioned description, and other objects not explicitly disclosed herein will be clearly understood by a person skilled in the art from the description provided hereinafter.

According to an aspect, a rack assist electric power steering apparatus may include: a ball nut coupled to a rack bar via a ball and including a protruded portion radially protruding from one axial end thereof; a nut pulley coupled to an outer circumferential surface of the ball nut; a support member axially supporting the nut pulley and coupled to the other axial end of the ball nut; and a rotary support member including first and second inner rings coupled to the outer circumferential surface of the ball nut between the protruded portion and the nut pulley and disposed on one axial side and the other axial side thereof, an outer ring coupled to an inner circumferential surface of a housing of the rack assist electric power steering apparatus, a first rolling member disposed between the first inner ring and the outer ring, and a second rolling member disposed between the second inner ring and the outer ring.

According to embodiments, shock between the rotary support member and the housing can be absorbed, backlash and friction in the rotary support member can be reduced, the length of the ball nut can be minimized, and the rotary support member can be supported by a portion in which the ball nut and the rack bar are coupled, thereby reducing noise.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to", "contacts or overlaps", etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Figure 1:
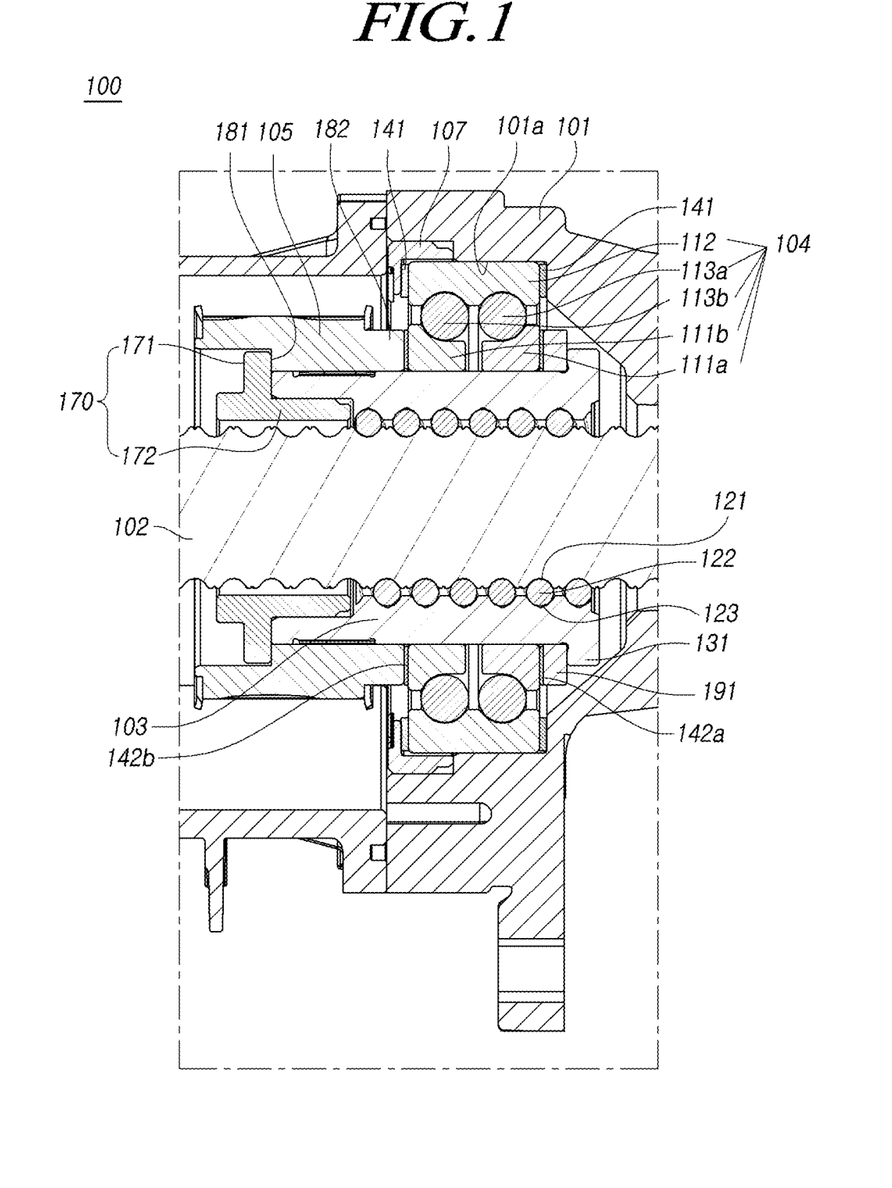
FIG. 1 is a cross-sectional view illustrating an assembled state of a rack assist electric power steering apparatus according to embodiments.
Figure 2:
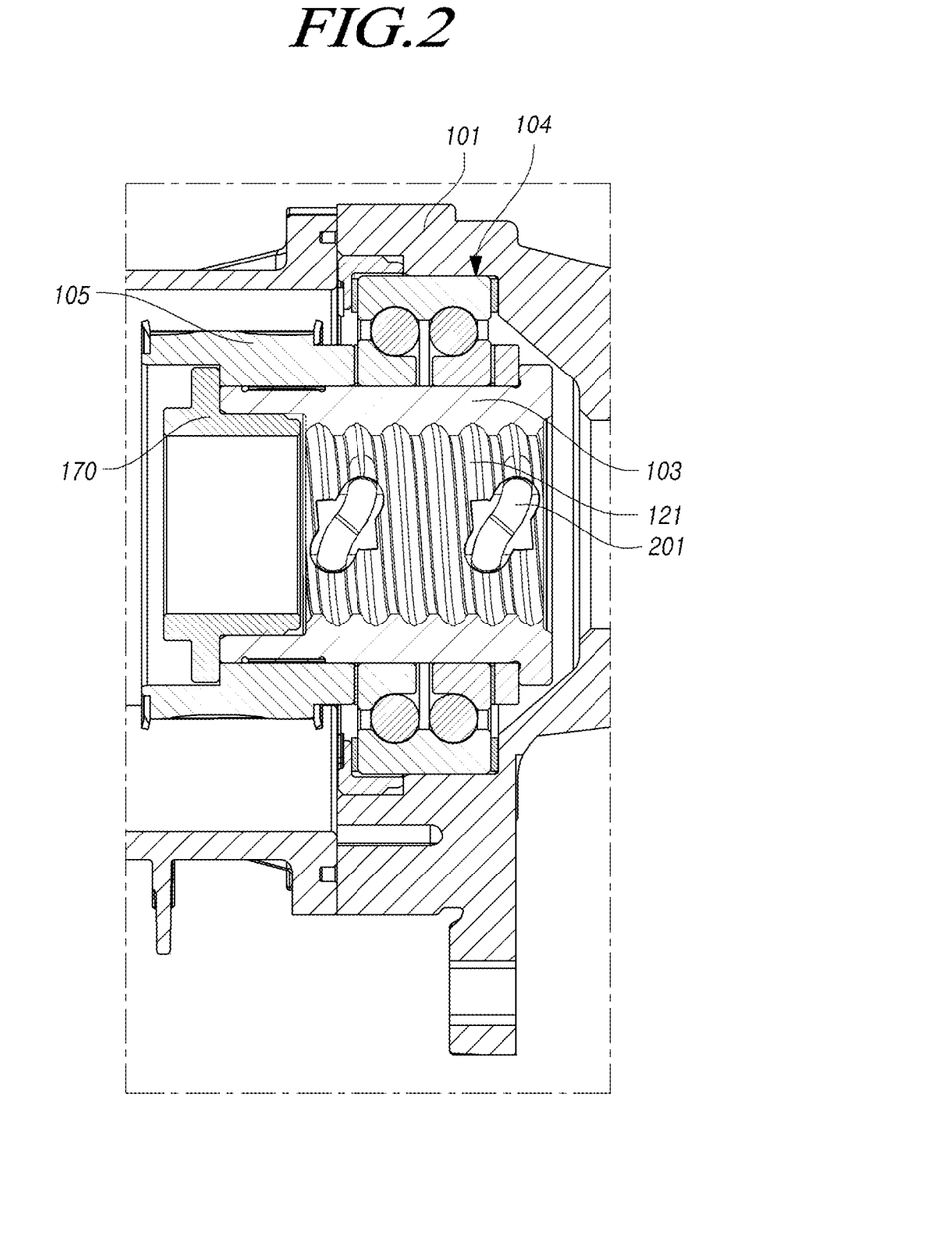
FIG. 2 is a cross-sectional view illustrating a portion of FIG. 1.
Figure 3:
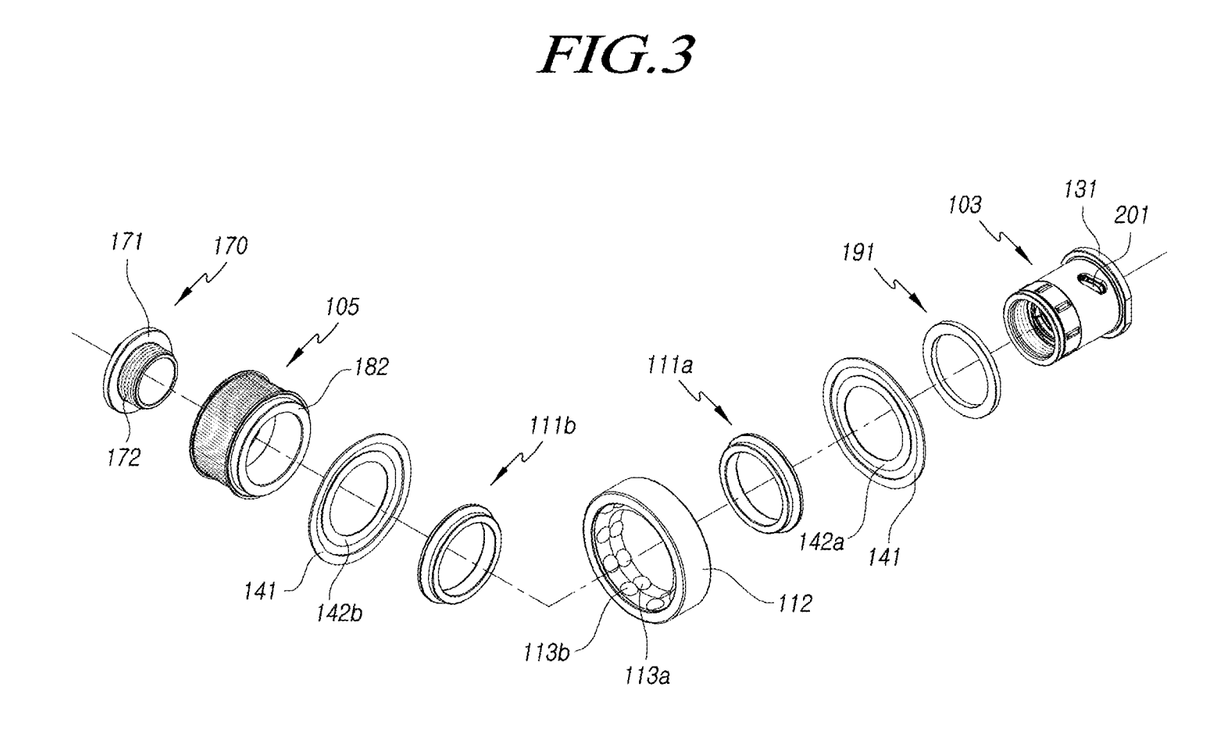
FIG. 3 is an exploded perspective view illustrating a portion of FIG. 1.
Figure 4:
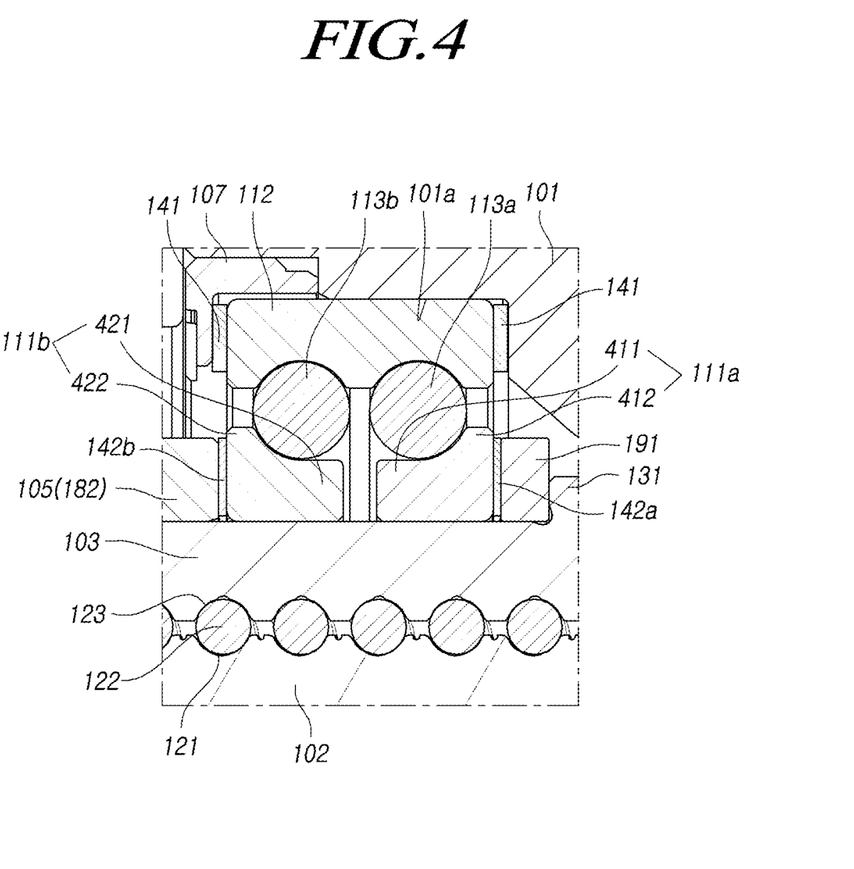
FIGS. 4 to 5 are enlarged views illustrating portions of FIG. 1.
Figure 5:
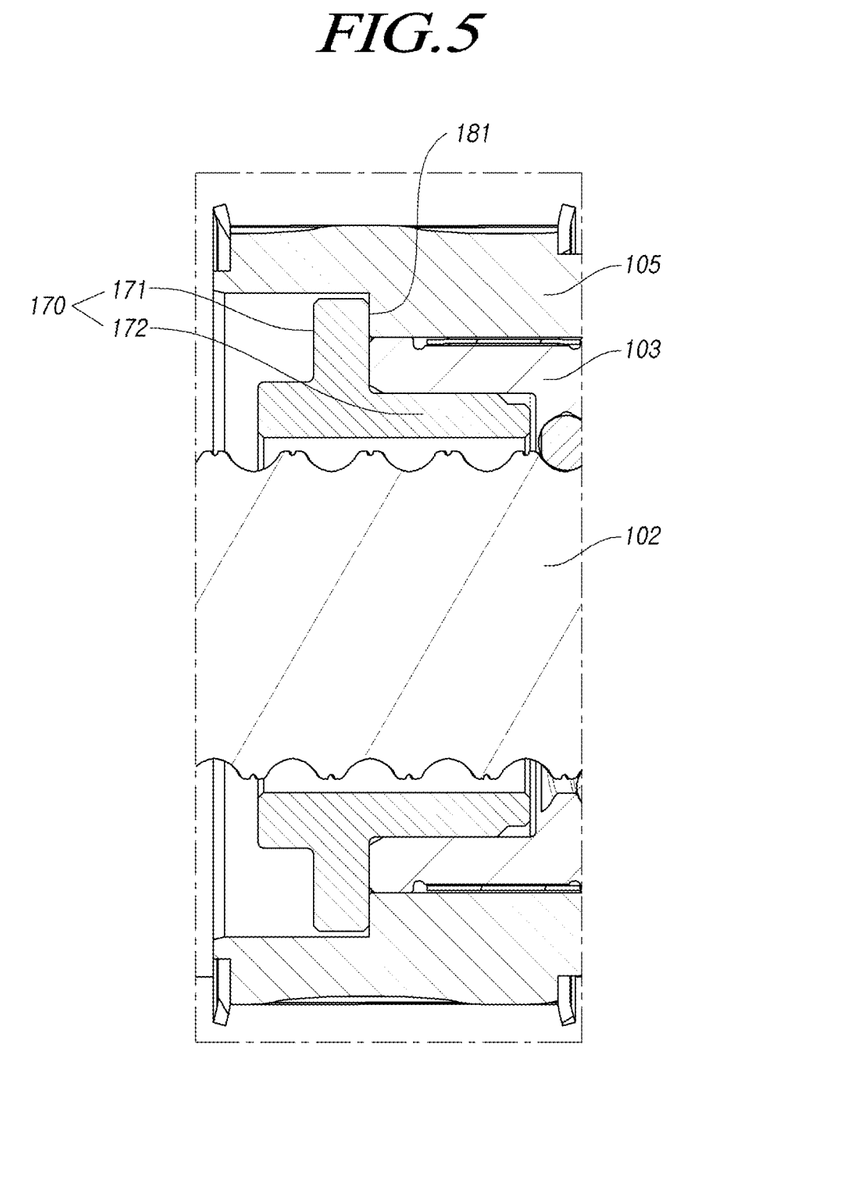
Figure 6:
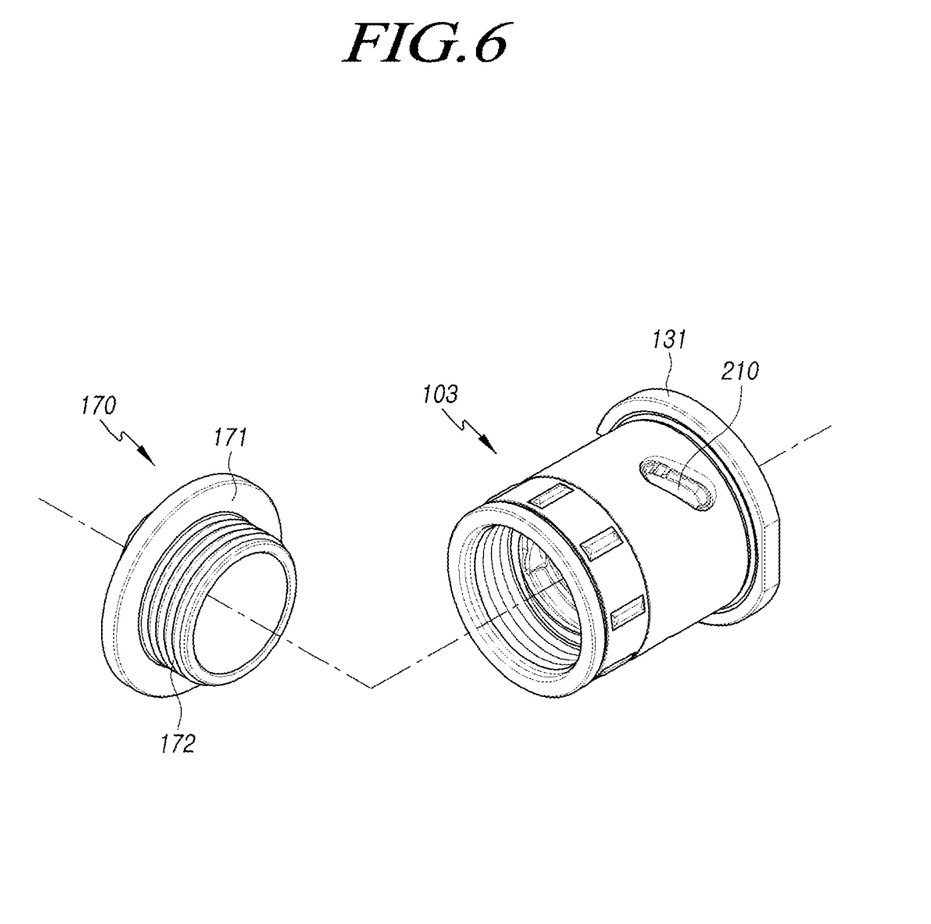
FIG. 6 is an exploded perspective view illustrating a portion of FIG. 5.
Figure 7:
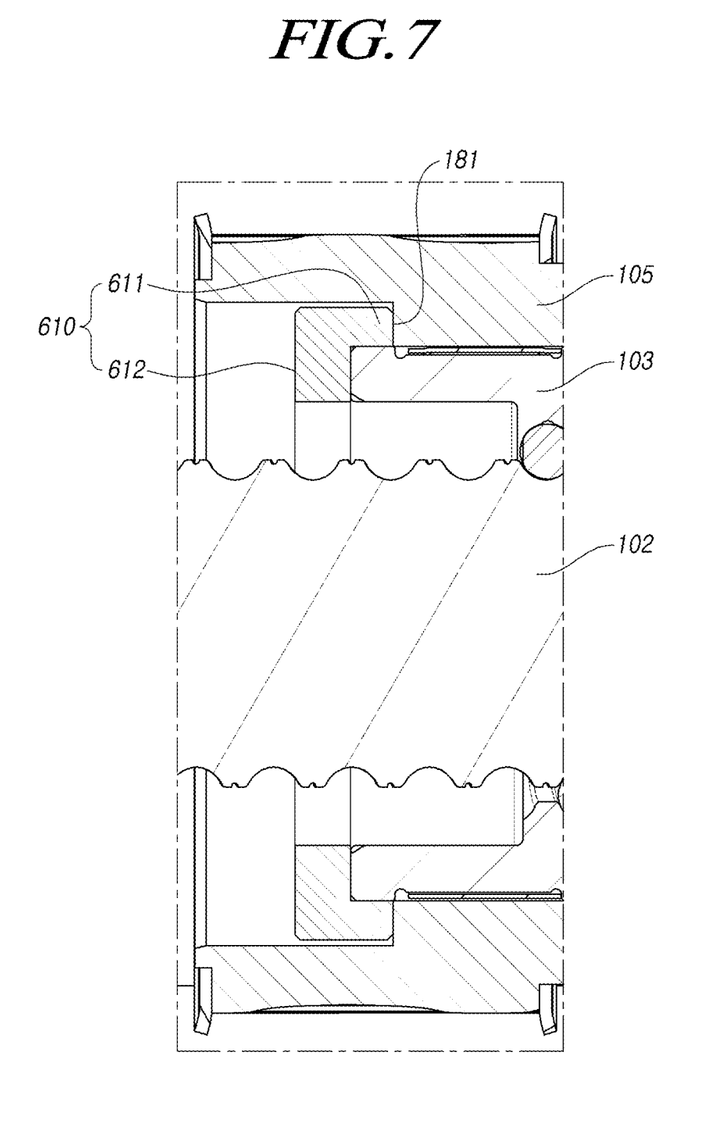
FIG. 7 is a cross-sectional view illustrating a portion of the assembled state of the rack assist electric power steering apparatus according to embodiments.
Figure 8:
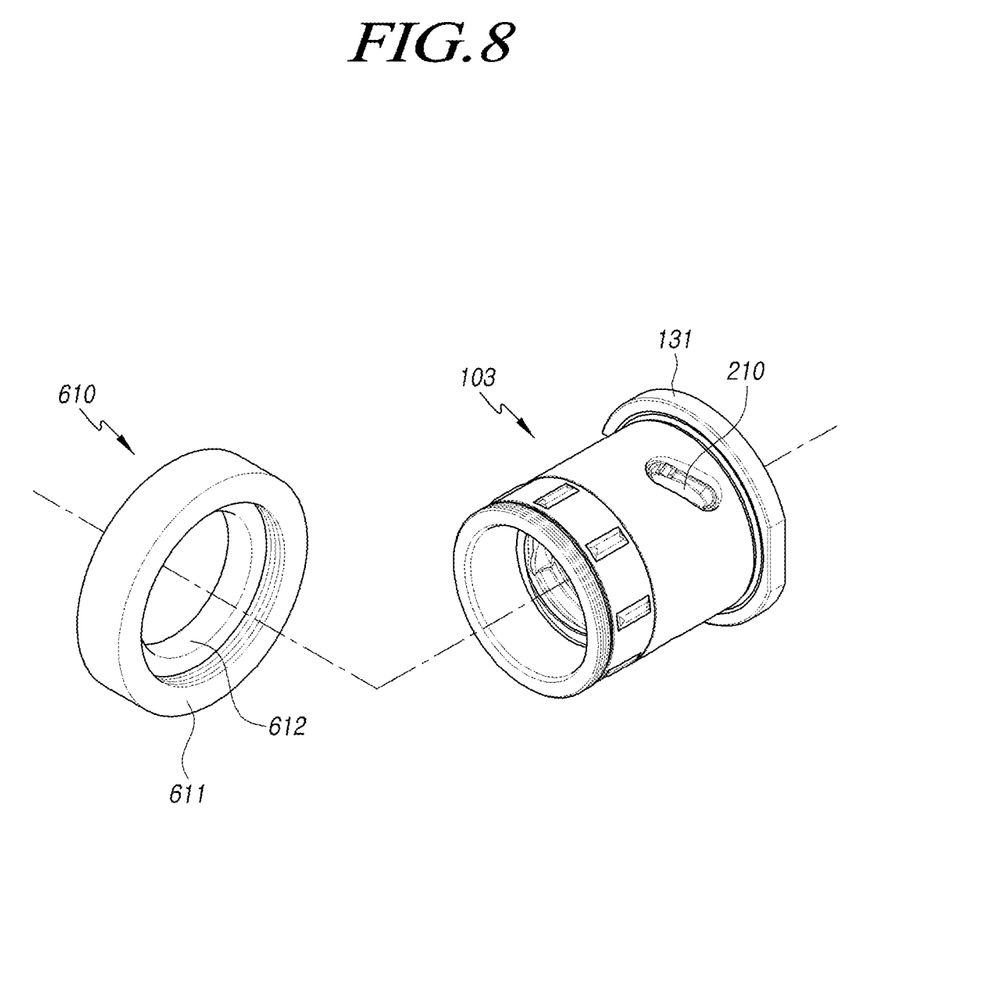
FIG. 8 is an exploded perspective view illustrating a portion of FIG. 7.

FIG. 1 is a cross-sectional view illustrating an assembled state of a rack assist electric power steering apparatus according to embodiments. FIG. 2 is a cross-sectional view illustrating a portion of FIG. 1. FIG. 3 is an exploded perspective view illustrating a portion of FIG. 1. FIGS. 4 to 5 are enlarged views illustrating portions of FIG. 1. FIG. 6 is an exploded perspective view illustrating a portion of FIG. 5. FIG. 7 is a cross-sectional view illustrating a portion of the assembled state of the rack assist electric power steering apparatus according to embodiments. FIG. 8 is an exploded perspective view illustrating a portion of FIG. 7.

Describing with reference to the drawings, a rack assist electric power steering apparatus 100 includes: a ball nut 103 coupled to a rack bar 102 via balls 122, and including a protruded portion 131 radially protruding from one axial end thereof; a nut pulley 105 coupled to an outer circumferential surface of the ball nut 103; a support member 170 or 610 axially supporting the nut pulley 105 and axially coupled to the other end of the ball nut 103; and a rotary support member 104 including first and second inner rings 111a and 111b coupled to the outer circumferential surface of the ball nut 103 between the protruded portion 131 and the nut pulley 105 and disposed on one side and the other side in the axial direction, an outer ring 112 coupled to an inner circumferential surface of a housing 101 of the rack assist electric power steering apparatus 100, first rolling members 113a disposed between the first inner ring 111a and the second inner ring 111b, and second rolling members 113b disposed between the second inner ring 111b and the outer ring 112.

The rack bar 102 and the ball nut 103 are provided with an outer spiral groove 121 and an inner spiral groove 123 to be coupled via the balls 122. The ball nut 103 is provided with circulation members 201 to allow the ball 122 to continuously circulate. The circulation members 201 connect both ends of a path, through which the balls 122 move in the inner screw groove 123 and the outer screw groove 121.

The nut pulley 105 is coupled to the outer circumferential surface of the ball nut 103. The nut pulley 105 is connected to a motor pulley (not shown) rotated by a motor (not shown) via a belt to transfer power of the motor, so that the ball nut 103 is rotated.

In addition, the ball nut 103 includes the protruded portion 131 protruding in the radial direction from one axial end thereof such that the rotary support member 104, the nut pulley 105, and the like are fixed to the outer circumferential surface of the ball nut 103. The support member 170 or 610 supporting the nut pulley 105 in the axial direction is coupled to the other axial end of the ball nut 103.

That is, the rotary support member 104, the nut pulley 105, and the like are moved to one axial side from the other axial side on the outer peripheral surface of the ball nut 103 and are prevented from deviating from the ball nut 103 by the protruded portion 131. The support member 170 or 610 is supported by the nut pulley 105 and is coupled to the other axial end of the ball nut 103. The rotary support member 104 includes the first inner ring 111a and the second inner ring 111b coupled to the outer circumferential surface of the ball nut 103 between the protruded portion 131 and the nut pulley 105. The first inner ring 111a is disposed on one axial side, and the second inner ring 111b is disposed on the axial other side.

In addition, the rotary support member 104 includes the outer ring 112 coupled to the housing 101, the first rolling members 113a provided between the first inner ring 111a and the outer ring 112, and the second rolling members 113b provided between the second inner ring 111b and the outer ring 112. The rotary support member 104 is supported by the housing 101 and supports rotation of the ball nut 103.

Since the rotary support member 104 includes the first rolling members 113a and the second rolling members 113b, the rotation of the ball nut 103 may be supported in a wider range in the axial direction as compared to the case in which rolling members are provided in a single line. In addition, since the number of the rolling members is increased, bearing power of the rotary support member 104 with respect to radial and axial loads generated in the ball nut 103 may be increased, thereby effectively preventing the movement of the ball nut 103 and reducing noise.

Furthermore, the rotary support member 104 supporting the rotation of the ball nut 103 may be disposed on the outer circumferential surface of the ball nut 103 such that an axial center of the rotary support member 104 is aligned with an axial center of a portion in which the ball nut 103 and the rack bar 102 are coupled, thereby more effectively absorbing the movement of the ball nut 103 to reduce noise.

That is, while the balls 122 are circulated at the portion in which the ball nut 103 and the rack bar 102 are coupled, power is transmitted, and the movement of the ball nut 103 is generated at the coupling portion. In order to suppress the movement, the rotary support member 104 supported by the housing 101 needs to support the portion in which the ball nut 103 and the rack bar 102 are coupled 102, i.e., a portion in which the inner screw groove 123 of the ball nut 103 is provided.

As will be described below, an annular member 191 (also referred to as an adjustment member) may be provided between the protruded portion 131 and the first inner ring 111a. The axial position of the rotary support member 104 may be changed according to an axial thickness of the annular member 191, and the axial center of the rotary support member 104 may be aligned with the center of the portion in which the ball nut 103 and the rack bar 102 are coupled.

In contrast, as described above, the outer ring 112 is coupled to the housing 101, and the rotary support member 104 is supported by the housing 101. For the rotary support member to be fixed in the axial direction, the housing 101 has an stepped portion 101a and a coupling member 107 is coupled to the housing 101.

That is, the stepped portion 101a of the housing 101 is defined by a stepped inner circumferential surface of the housing 101. The outer ring 112 is seated on the stepped portion 101a, with one axial side surface thereof being supported by the housing 101. The coupling member 107 supported by the other axial side surface of the outer ring 112 is coupled to the housing 101. Accordingly, the rotary support member 104 is fixed in the axial direction.

The coupling member 107 has an annular shape to be coupled to the inner circumferential surface of the housing 101. As illustrated in the drawings, a portion of the coupling member 107 extends inwardly in the radial direction to be supported by the other side surface of the outer ring 112.

In this case, damping members 141 may be provided to reduce noise caused by shock between the housing 101 and the coupling member 107 when the ball nut 103 is rotated and is moved. The damping members 141 may be provided in at least one of a space between the outer ring 112 and the housing 101, in a space between the outer ring 112 and the coupling member 107, or in both of the spaces.

That is, when none of the damping members 141 are provided, a movement may be generated in the ball nut 103 when the motor rotates in forward and reverse directions, and thus, the outer ring 112 may collide with the housing 101 and the coupling member 107 to generate noise. Accordingly, the damping members 141 are provided to reduce the noise.

The damping members 141 may be particularly coupled between the outer ring 112 and the housing 101 and between the outer ring 112 and the coupling member 107. The damping members 141 may respectively be a wave washer, a spring, or the like which provides an elastic force in the axial direction, similar to first and second elastic members 142a and 142b to be described below.

Meanwhile, describing with reference to FIGS. 3 to 4, the rotary support member 104 may be attached to the outer circumferential surface of the ball nut 103. That is, the first inner ring 111a, the second inner ring 111b, and the like may be attached to the ball nut 103 without elastic deformation of the first rolling members 113a and the second rolling members 113b.

The first inner ring 111a includes a first insertion portion 411 inserted between the first rolling members 113a and the ball nut 103 and a first support portion 412 radially protruding from one axial end of the first inner ring 111a to extend beyond the outer circumferential surface of the first insertion portion 411. The second inner ring 111b includes a second insertion portion 421 inserted between the second rolling members 113b and the ball nut 103 and a second support portion 422 radially protruding from the other axial end of the second inner ring 111b to extend beyond the outer circumferential surface of the second insertion portion 421.

As illustrated in the drawings, the first inner ring 111a including the first insertion portion 411 and the first support portion 412 is provided such that the radial thickness of one axial side thereof is greater than the radial thickness of the other axial side thereof. The second inner ring 111b including the second insertion portion 421 and the second support portion 422 is provided such that the radial thickness of the other axial side thereof is greater than the radial thickness of one axial side thereof.

That is, the first inner ring 111a and the second inner ring 111b are not fixedly coupled to the first rolling members 113a and the second rolling members but are attached to the first rolling members 113a and the second rolling members 113b to be detachable in the axis direction. Describing the sequence of attaching the rotary support member 104 to the ball nut 103, first, the first inner ring 111a is coupled to the outer circumferential surface of the ball nut 103 such that the protruded portion 131 prevents the first inner ring 111a from being detached from the outer circumferential surface of the ball nut 103. The outer ring 112, and the first rolling members 113a and the second rolling members 113b supported by and the inner circumferential surface of the outer ring 112, are moved to one axial side from the other axial side, the first insertion portion 411 is inserted between the first inner ring 111a and the ball nut 103, and the first rolling members 113a are supported by the first support portion 412. The second inner ring 111b is moved to one side from the other side in the axis direction, the second insertion portion 421 is inserted between the second rolling members 113b and the ball nut 103, and the second support portion 422 is supported by the second rolling members 113b. Accordingly, the attachment of the rotary support member 104 to the outer circumferential surface of the ball nut 103 is completed.

The nut pulley 104 and the support member 170 or 610 may be sequentially coupled after the second inner ring 111b is attached to the ball nut 103. The first and second elastic members 142a and 142b to be described below may be coupled before the first inner ring 111a is coupled to the ball nut 103 or before the second inner ring 1 is coupled to the ball nut 103.

Since the first inner ring 111a and the second inner ring 111b are provided as described above, the rotary support member 104 may be assembled without elastic deformation of the first rolling members 113a and the second rolling members 113b. Accordingly, the first inner ring 111a and the second inner ring 111b may be pressed by the first and second elastic members 142a and 142b to be described below.

In addition, since the first inner ring 111a and the second inner ring 111b are provided to be spaced apart from each other in the axial direction, the support member 170 or 610 may be coupled to the ball nut 103 while being supported by the nut pulley 105. Accordingly, backlash in the rotary support member 104 may be reduced, and thus, noise may be reduced.

That is, the support member 170 or 610 supports the nut pulley 105 and is coupled to the ball nut 103 in the axial direction. Since the first inner ring 111a and the second inner ring 111a are spaced apart from each other, the first inner ring 111a and the second inner ring 111b may be pressed when the support member 170 or 610 is coupled to the ball nut 103. Accordingly, the first inner ring 111a, the first rolling members 113a, the outer ring 112, and the second rolling members 113b may be pressed against each other to reduce backlash.

In contrast, as the support member 170 or 610 is coupled to the ball nut 103, the first inner ring 111a and the second inner ring 111b are pressed. When pressure applied to the first inner ring 111a and the second inner ring 111b is excessively high, a significant amount of friction may be generated in the rotary support member 104 when the ball nut 103 is rotated. Accordingly, the rotation of the ball nut 130 may not be smoothly supported, and noise may also be generated. The first elastic member 142a and the second elastic member 142b may be provided to prevent the noise.

That is, since the first elastic member 142a is provided between the first inner ring 111a and the protruded portion 131 and the second inner ring 142a is provided between the second inner ring 111b and the nut pulley 105, when the support member 170 or 610 is coupled to the ball nut 103 to press the nut pulley 105, the first elastic members 142a and the second elastic members 142b may be compressed to apply certain pressure to the first inner ring 111a and the second inner ring 111b, thereby reducing backlash to prevent generation of friction and reduce noise.

In other words, since the support member 170 or 610 is supported by the nut pulley 105 and is coupled to the ball nut 103, the first elastic member 142a and the second elastic member are compressed, and the first inner ring 111a and the second inner ring 111b receive elastic forces of the first elastic member 142a and the second elastic member 142b. Accordingly, friction is reduced as compared to the case in which the first elastic member 142a and the second elastic member 142b are not provided.

For example, each of the first elastic member 142a and the second elastic member 142b may be implemented as a wave washer.

In addition, as described below, when the support member 170 or 610 is coupled to the ball nut 103, an outer protrusion 171 or an inner protrusion 612 may limit a depth in the axial direction, to which the support member 170 or 610 is coupled to the ball but 103, while being supported by the ball nut 103, so that the elastic forces provided to the first inner ring 111a and the second inner ring 111b from the first elastic member 142a and the second elastic member 142b may be maintained constantly.

Furthermore, as described above, the ball nut 103 is provided with the annular member 191. The annular member 191 may be disposed between the protruded portion 131 and the first elastic member first elastic member 142a to change the axial position of the rotary support member 104.

In addition, as illustrated in the drawings, the radial height of the protruded portion 131 may be limited by the shape of the housing 101. In this case, the adjustment member 191 may be provided, and thus, even when the radial height of the protruded portion 131 is lower than that of the first inner ring 111a, the height of the first adjustment member 191 may correspond to that of the first inner ring 111a. Accordingly, the first elastic member 142a may be fully compressed between the first inner ring 111a and the adjustment member 191.

Furthermore, the nut pulley 105 may include a protrusion 182 protruding from one axial side surface of the nut pulley 105 in the axial direction, such that the second elastic member 142b may be compressed between the second inner ring 111b and the protrusion 182.

In other words, since the nut pulley 105 is connected to the motor via the belt, the protrusion 182 protrude in the axial direction, such that a portion of the nut pulley 105 coupled to the belt is spaced apart from a portion of the nut pulley 105 supported by the second elastic member 142b in the axial direction. Accordingly, interference between components may be prevented, thereby smoothly rotating the ball nut 103.

Meanwhile, the nut pulley 105 has an increased-diameter portion 181 defined by an expanded inner circumferential surface on the other end thereof. The support member 170 or 610 may be supported by the increased-diameter portion 181, thereby minimizing an axial length of the ball nut 103. As described above, the support member 170 or 610 is coupled to the ball nut 103 while being supported by the nut pulley 105 in the axial direction. Since the increased-diameter portion 181 is provided in the nut pulley 105, the support member 170 or 610 may be supported by the increased-diameter portion 181 rather than the other end of the nut pulley 105 and may be supported by the nut pulley 105 in the axial direction.

Therefore, even in the case in which the other end of the ball nut 103 extends to a portion in which the increased-diameter portion 181 of the nut pulley 105, instead of extending to the other axial end of the nut pulley 105, the support member 170 or 610 may be coupled to the ball nut 103 and be supported by the nut pulley 105 in the axial direction, thereby minimizing the axial length of the ball nut 103.

In contrast, the support member 170 or 610 may be coupled to an inner circumferential surface or outer circumferential surface of the ball nut 103. When the support member 170 or 610 is coupled to the ball nut 103, the support member 170 or 610 may be supported by the ball nut 103 in the axial direction, and a depth, to which the support member 170 or 610 is coupled to the ball but 103, may be limited. Accordingly, pressure applied to the first inner ring 111a and the second inner ring 111b by the first elastic member 142a and the second elastic member 142b may be constantly maintained to prevent friction from being excessively generated in the rotary support member 104.

As described above, the first elastic member 142a is provided between the protruded portion 131 and the first inner ring 111a, and the second elastic member 142b is provided between the nut pulley 105 and the second inner ring 111b. As the support member 170 or 610 is coupled to the ball nut 103 while supporting the nut pulley 105 in the axial direction, the first elastic member 142a and the second elastic member 142b are compressed to provide elastic forces to the first inner ring 111a and the second inner ring 111b. Therefore, a degree, by which the first elastic member 142a and the second elastic member 142b are compressed, is changed according to an axial depth to which the support member 170 or 610 is coupled to the ball nut 103.

However, if the axial depth, to which the support member 170 or 610 is coupled to the ball nut 103, is not limited, the degree, by which the first elastic member 142a and the second elastic member 142b are compressed, may be increased as the support member 170 or 610 is coupled to the ball but 103, so that the elastic forces provided to the first inner ring 111a and the second inner ring 111b may be increased. Consequently, friction may be excessively generated in the rotary support member 104 to increase noise. Accordingly, the depth, to which the support member 170 or the 610 is coupled to the ball but 103, may be limited to prevent friction and noise from being generated in the rotary support member 104.

In addition, since an axial distance between the support member 170 or 610 and the protruded portion 131 is constantly maintained, the amount of compression of the first elastic member 142a and the amount of compression of the second elastic member 142b may be always maintained constant. Accordingly, the elastic forces provided to the first inner ring 111a and the second inner ring 111b may be constantly maintained to prevent noise from being generated in the rotary support member 104 even when the ball nut 103 is moved.

Describing with reference to FIGS. 5 to 6, the support member 170 may include an inner body 172 coupled to the inner circumferential surface of the ball nut 103 and the outer protrusion 171 protruding in the radial direction from the outer circumferential surface of the inner body 172 and supported by the nut pulley 105 and the ball nut 103 in the axial direction.

In addition, the inner body 172 is screw-coupled to the ball nut 103. As the support member 170, coupled to the ball nut 103 while supporting the nut pulley 105, proceeds, the amounts of compression of the first elastic member 142*a* and the second elastic member 142*b* are increased. The outer protrusion 171 of the support member 170 is supported by the increased-diameter portion 181 and is supported by the nut pulley 105 in the axial direction. As the support member 170 proceeds, the support member 170 is supported by the other end of the ball nut 103 to limit an axial depth, to which the support member 170 is coupled to the ball nut 103.

That is, when the support member 170 is screw-coupled to the ball nut 103, the outer protrusion 173 may be supported by the other axial end of the ball nut 103, and thus, the support member 170 may not further proceed physically. Accordingly, when the support member 170 is screw-coupled, friction and noise may be prevented from being generated in the rotary support member 104 due to the elastic forces provided by the first elastic member 142*a* and the second elastic member 142*b*. Describing with reference to FIGS. 7 to 8, the support member 610 may include an outer body 611 axially supported by the nut pulley 105 and coupled to the outer circumferential surface of the ball nut 103 and the inner protrusion 611 radially extending from an inner circumferential surface of the outer body 611 and axially supported by the ball nut 103.

In addition, the outer body 611 is screw-coupled to the ball nut 103. As the support member 610, coupled to and supporting the nut pulley 105, proceeds, the amounts of compression of the first elastic member 142*a* and the second elastic member 142*b* are increased.

In addition, the outer body 611 of the support member 610 is supported by the increased-diameter portion 181 and is supported by the nut pulley 105 in the axial direction. As the support member 610 proceeds, the inner protrusion 612 is supported by the other end of the ball nut 103 to limit an axial depth, to which the support member 610 is coupled to the ball nut 103. That is, as described above, the support member 610 may be supported by the ball nut 103 in the axial direction and may not further proceed physically, thereby reducing friction in the rotary support member 104.

According to the rack assist electric power steering apparatus having the above-described shape, the rotary support member is supported by a portion in which the ball nut and the rack bar are coupled, and thus, the movement of the ball nut may be effectively suppressing by the rotary support member.

In addition, since the inner ring of the rotary support member is provided separate and is supported by the support member, backlash in the rotary support member may be reduced to reduce noise.

Furthermore, since the damping member is provided on both surfaces of the outer ring supported by the housing, noise may be reduced by absorbing shock between the rotary support member and the housing when the ball nut is moved.

In addition, when the support member is coupled to the ball nut while supporting the nut pulley, the depth, to which the support member is coupled, may be limited, thereby reducing friction in the rotary support member.

The above description and the accompanying drawings provide an example of the technical idea of the present invention for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure. In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A rack assist electric power steering apparatus comprising:
   a ball nut coupled to a rack bar via a ball and including a protruded portion radially protruding from one axial end thereof;
   a nut pulley coupled to an outer circumferential surface of the ball nut;
   a support member axially supporting the nut pulley and coupled to the other axial end of the ball nut;
   a rotary support member including first and second inner rings coupled to the outer circumferential surface of the ball nut between the protruded portion and the nut pulley and disposed on one axial side and the other axial side thereof, an outer ring coupled to an inner circumferential surface of a housing of the rack assist electric power steering apparatus, a first rolling member disposed between the first inner ring and the outer ring, and a second rolling member disposed between the second inner ring and the outer ring;
   a first elastic member provided between the protruded portion and the first inner ring; and
   a second elastic member provided between the nut pulley and the second inner ring,
   wherein the support member includes an outer body coupled to the outer circumferential surface of the ball nut and axially supported by the nut pulley and an inner protrusion protruding from an inner circumferential surface of the outer body and axially supported by the ball nut.

2. The rack assist electric power steering apparatus according to claim 1, wherein the housing includes a stepped portion on an inner circumferential surface thereof, and
   the outer ring is seated on the stepped portion, and a coupling member supported by the outer ring is coupled to the housing.

3. The rack assist electric power steering apparatus according to claim 2, further comprising a damping member provided between the outer ring and the housing, between the outer ring and the coupling member, or between the outer ring and the housing and between the outer ring and the coupling member.

4. The rack assist electric power steering apparatus according to claim 1, wherein the first inner ring includes a first insertion portion inserted between the first rolling member and the ball nut and a first support portion axially protruding from one end of the first inner ring to extend beyond an outer circumferential surface of the first insertion portion, and
   the second inner ring includes a second insertion portion inserted between the second rolling member and the ball nut and a second support portion radially protruding from the axial other end of the second inner ring to extend beyond an outer circumferential surface of the second insertion portion.

5. The rack assist electric power steering apparatus according to claim 1, wherein the first inner ring and the second inner ring are axially spaced apart from each other.

6. The rack assist electric power steering apparatus according to claim 1, further comprising an annular member disposed between the protruded portion and the first elastic member to be coupled to the outer circumferential surface of the ball nut.

7. The rack assist electric power steering apparatus according to claim 1, wherein the nut pulley includes a protrusion axially protruding from one axial side surface of the nut pulley.

8. The rack assist electric power steering apparatus according to claim 1, wherein the nut pulley includes an increased-diameter portion defined by an expanded inner circumferential surface on the other end thereof, and the support member is supported by the increased-diameter portion.

9. The rack assist electric power steering apparatus according to claim 1, wherein the support member further includes an outer protrusion protruding from an outer circumferential surface of the inner body and axially supported by the nut pulley and the ball nut.

10. The rack assist electric power steering apparatus according to claim 9, wherein the inner body is screw-coupled to the ball nut.

11. The rack assist electric power steering apparatus according to claim 1, wherein the outer body is screw-coupled to the ball nut.

12. The rack assist electric power steering apparatus according to claim 1, wherein amounts of compression of the first and second elastic members are maintained constantly.

13. A rack assist electric power steering apparatus comprising:
a ball nut coupled to a rack bar via a ball and including a protruded portion radially protruding from one axial end thereof;
a nut pulley coupled to an outer circumferential surface of the ball nut;
a support member axially supporting the nut pulley and coupled to the other axial end of the ball nut;
a rotary support member including first and second inner rings coupled to the outer circumferential surface of the ball nut between the protruded portion of the ball nut and the nut pulley and disposed on one axial side and the other axial side thereof, an outer ring coupled to an inner circumferential surface of a housing of the rack assist electric power steering apparatus, a first rolling member disposed between the first inner ring and the outer ring, and a second rolling member disposed between the second inner ring and the outer ring;
an elastic member provided between the protruded portion of the ball nut and the first inner ring of the rotary support member; and
an annular member disposed between the protruded portion of the ball nut and the elastic member to be coupled to the outer circumferential surface of the ball nut,
wherein the support member includes an outer body coupled to the outer circumferential surface of the ball nut and axially supported by the nut pulley and an inner protrusion protruding from an inner circumferential surface of the outer body and axially supported by the ball nut.

14. A rack assist electric power steering apparatus comprising:
a ball nut coupled to a rack bar via a ball and including a protruded portion radially protruding from one axial end thereof;
a nut pulley coupled to an outer circumferential surface of the ball nut;
a support member axially supporting the nut pulley and coupled to the other axial end of the ball nut; and
a rotary support member including first and second inner rings coupled to the outer circumferential surface of the ball nut between the protruded portion and the nut pulley and disposed on one axial side and the other axial side thereof, an outer ring coupled to an inner circumferential surface of a housing of the rack assist electric power steering apparatus, a first rolling member disposed between the first inner ring and the outer ring, and a second rolling member disposed between the second inner ring and the outer ring,
wherein the support member includes an outer body coupled to the outer circumferential surface of the ball nut and axially supported by the nut pulley and an inner protrusion protruding from an inner circumferential surface of the outer body and axially supported by the ball nut.

* * * * *